US006873840B1

(12) United States Patent
von Alten

(10) Patent No.: US 6,873,840 B1
(45) Date of Patent: Mar. 29, 2005

(54) RESOURCE ACCESS/RETURN SYSTEM

(75) Inventor: Thomas W. von Alten, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 746 days.

(21) Appl. No.: 09/710,128

(22) Filed: Nov. 8, 2000

(51) Int. Cl.[7] ......................... H04M 15/00; G10S 13/75

(52) U.S. Cl. .................... 455/410; 455/411; 455/569.2; 455/575.9; 340/5.62; 340/5.8; 340/5.72

(58) Field of Search ................................ 455/410, 411, 455/9, 11.1, 12.1, 41.1, 41.2, 67.11, 74, 569.2, 558, 575.9; 340/310.01–310.07, 825.69, 426; 307/10.2, 104

(56) References Cited

U.S. PATENT DOCUMENTS 4,965,821 A * 10/1990 Bishop et al. .............. 455/409
5,552,789 A * 9/1996 Schuermann .............. 340/5.21
5,726,885 A * 3/1998 Klein et al. .............. 455/456.6
5,939,975 A * 8/1999 Tsuria et al. ........... 340/426.18
6,011,320 A * 1/2000 Miyamoto et al. ..... 340/426.18
6,417,781 B1 * 7/2002 Matsumoto ................. 340/901
6,636,145 B1 * 10/2003 Murakami et al. ........... 340/5.9

OTHER PUBLICATIONS

New York Times, May 30, 2000, “A Little Pill with a Zoom Lens”.

* cited by examiner

*Primary Examiner*—David Hudspeth
*Assistant Examiner*—Kamran Afshar

(57) ABSTRACT

The present disclosure relates to an access/return system with which a user can be permitted to temporarily use a resource. In particular, the system can be used for receiving user identity information with an identity confirmation device of the resource, confirming the identity of the user with a security device of the resource, providing the user with access to the resource, monitoring and recording information about use of the resource with a monitoring system of the resource, reacquiring the resource from the user, and obtaining resource use information from the resource monitoring system of the resource.

44 Claims, 3 Drawing Sheets

RESOURCE ACCESS/RETURN SYSTEM

FIELD OF THE INVENTION

The present disclosure relates to a resource access/return system. More particularly, the present disclosure relates to a system and method for accessing and returning a resource such as an automobile.

BACKGROUND OF THE INVENTION

Where resources are made available to the general public or to a particular group of people for temporary use, resource access/return systems are used to provide and reacquire the resources. For instance, many corporations provide access to company cars to employees for temporary (e.g., single day) use. In another example, rental car companies permit customers to use the companies' automobiles in exchange for a fee based upon the duration of use and/or the number of miles driven.

In either of the example scenarios identified above, there are several managerial tasks that need to be conducted, many by a human agent. For example, in either situation, the automobiles must be made available to the users and later reacquired from the users. The first of these actions normally requires the transfer of a key to the user, recordation of the user's identity and information concerning the particular automobile taken, adjustments to the car "inventory," and so forth. Reacquisition of the resource normally involves the return of the keys, recordation of the mileage driven, readjustment of the car inventory, and the like. In the rental context, automobile return typically further involves the payment of a rental fee on the part of the user and often requires the user to return the car at a location remote from the desired destination, for instance, an airport terminal.

Although current access/return systems function adequately well, the requirement of human intermediation both complicates the procedures and wastes the user's time. Additionally, in the rental context, present return systems can be particularly disadvantageous where the user (i.e., renter) is running late and does not have time to return the car at a remote location.

From the foregoing, it can be appreciated that it would be desirable to have a resource access/return system that is wholly or partially automated so as to simplify and expedite the resource access and return processes.

SUMMARY OF THE INVENTION

The present disclosure relates to an access/return system with which a user can be permitted to temporarily use a resource. In particular, the system can be used for receiving user identity information with an identity confirmation device of the resource, confirming the identity of the user with a security device of the resource, providing the user with access to the resource, monitoring and recording information about use of the resource with a monitoring system of the resource, reacquiring the resource from the user, and obtaining resource use information from the resource monitoring system of the resource.

In a preferred arrangement, the system is used for permitting a user to temporarily use an automobile. In such an arrangement, the system can be used for receiving identity information from a user identity card with a card reader provided on the exterior of the automobile, receiving a user code with a security device provided on the exterior of the automobile, unlocking the automobile doors in response to receiving a user code that correctly corresponds to the identity card, and permitting the automobile engine to be started once the user identity card is received by a card reader located inside the automobile.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
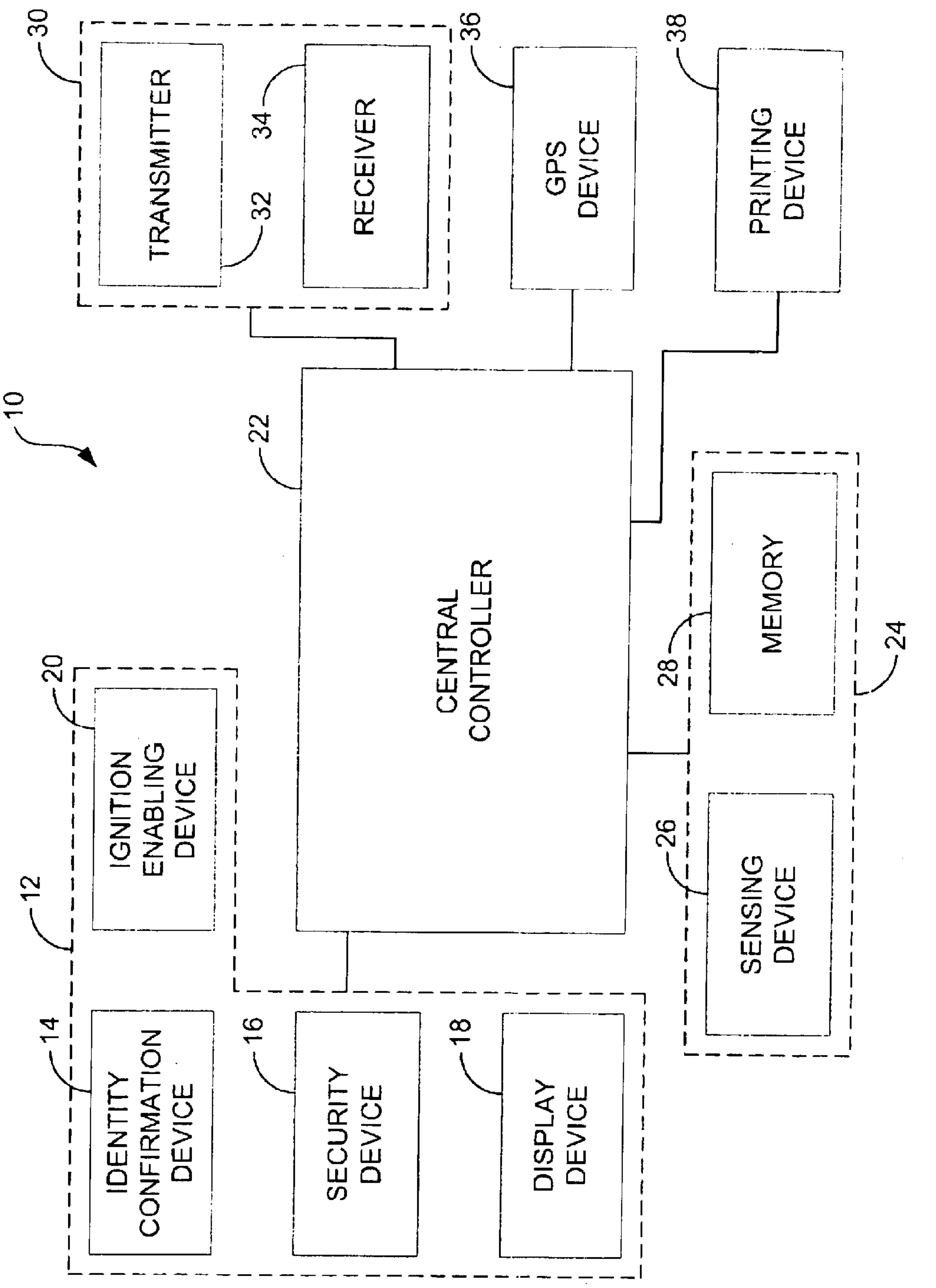
FIG. 1 is a block diagram of an access/monitoring system that can be used in the access/return system of the present invention.

Referring now in more detail to the drawings, in which like numerals indicate corresponding parts throughout the several views, FIG. 1 illustrates an access/monitoring system 10 that can be used in the access/return system of the present invention. Although many different components are illustrated in FIG. 1, it will be apparent from the discussion that follows that many of these components are optional and therefore not necessary in every scenario.

The access/monitoring system 10 illustrated in FIG. 1 normally is embodied in the resource that is to be provided to and later reacquired from a user. By way of example, the resource can comprise an automobile that is temporarily lent to the user as a free service (e.g., by the user's employer) or in return for payment of a rental fee. As indicated in FIG. 1, the system 10 includes a user interface 12 with which the user can interact with the resource. As will be understood from the present disclosure, this interface 12 simplifies the access and return procedures and greatly reduces time required on the part of the user. By way of example, the user interface 12 can include an identity confirmation device 14, a security device 16, and a display device 18. Where the resource is an automobile, the system 10 can include an ignition enabling device 20 and the identity confirmation device 14 preferably comprises a card reader that is accessible to the user from the car's exterior. For instance, the card reader can be integrated into the exterior panel of the driver's side door of the automobile. Typically, the card reader is a magnetic card reader that is adapted to receive an identity card having a magnetic strip formed thereon, similar in nature to a conventional credit card. Alternatively, the card reader can comprise a device adapted to read information from an identity card having a solid-state chip embedded therein.

The security device 16 typically comprises an interface device with which the user can enter a user code such as a password and/or a personal identification number (PIN) that, in conjunction with the user's identity card, permits the user to access the resource. By way of example, the security device 16 can comprise a key pad that is similarly integrated into driver's side door adjacent the identity confirmation device 14. In like manner, the display device 18 can be integrated into the automobile's exterior. By way of example, the display device 18 can comprise a liquid crystal display (LCD) with which information can be communicated to the user. The ignition enabling device 20 preferably comprises a card slot which, like the identification confirmation device 14, is adapted to receive the identity card of the user. By way of example, the ignition enabling device 20 can be provided within the vehicle (e.g., in the vehicle dash). As its name suggests, the ignition enabling device 20 is in operation with the automobile ignition system such that the automobile's engine can be started by the user after insertion of the user's identity card.

The access/monitoring system 10 further includes a central controller 22 that is in electrical communication with the user interface 12. By way of example, the central controller 22 can include a central processing unit (CPU) and software commands that communicate with the user interface 12 and control operation of the various other components of the system 10. Connected to the central controller 22 is a monitoring system 24 that normally includes a sensing device 26 and a memory 28. The sensing device 28 can comprises a plurality of sensors that monitor particular resource parameters. The memory 28 is in electrical communication with the sensing device 26 and can record the information collected by the sensing device. By way of example, the memory can comprise a solid-state memory devices such as flash memory devices, dynamic random access memory (DRAM) devices, magnetic random access memory (MRAM) devices, atomic resolution storage (ARS) devices, or suitable analogue. Of these memory device types, ARS devices are preferred due to their high capacity and low cost.

With further reference to FIG. 1, the access/monitoring system 10 can additionally comprise a communications module 30. As indicated in FIG. 1, the communications module 30 can include a transmitter 32 and a receiver 34. Normally, the communications module 30 is used in a short-range wireless communication system with which information can be transmitted from and received by the system 10. Also illustrated in FIG. 1 is a global positioning system (GPS) device 36 that is connected to the central controller 22. As is known in the art, the GPS device 36 can be used to track the location of the automobile through the use of geosynchronous satellite communications. Additionally, the access/monitoring system 10 can further include a printing device 38 with which a record of resource use and/or use fees can be printed for the user in the: form of a paper hard copy.

Figure 2:
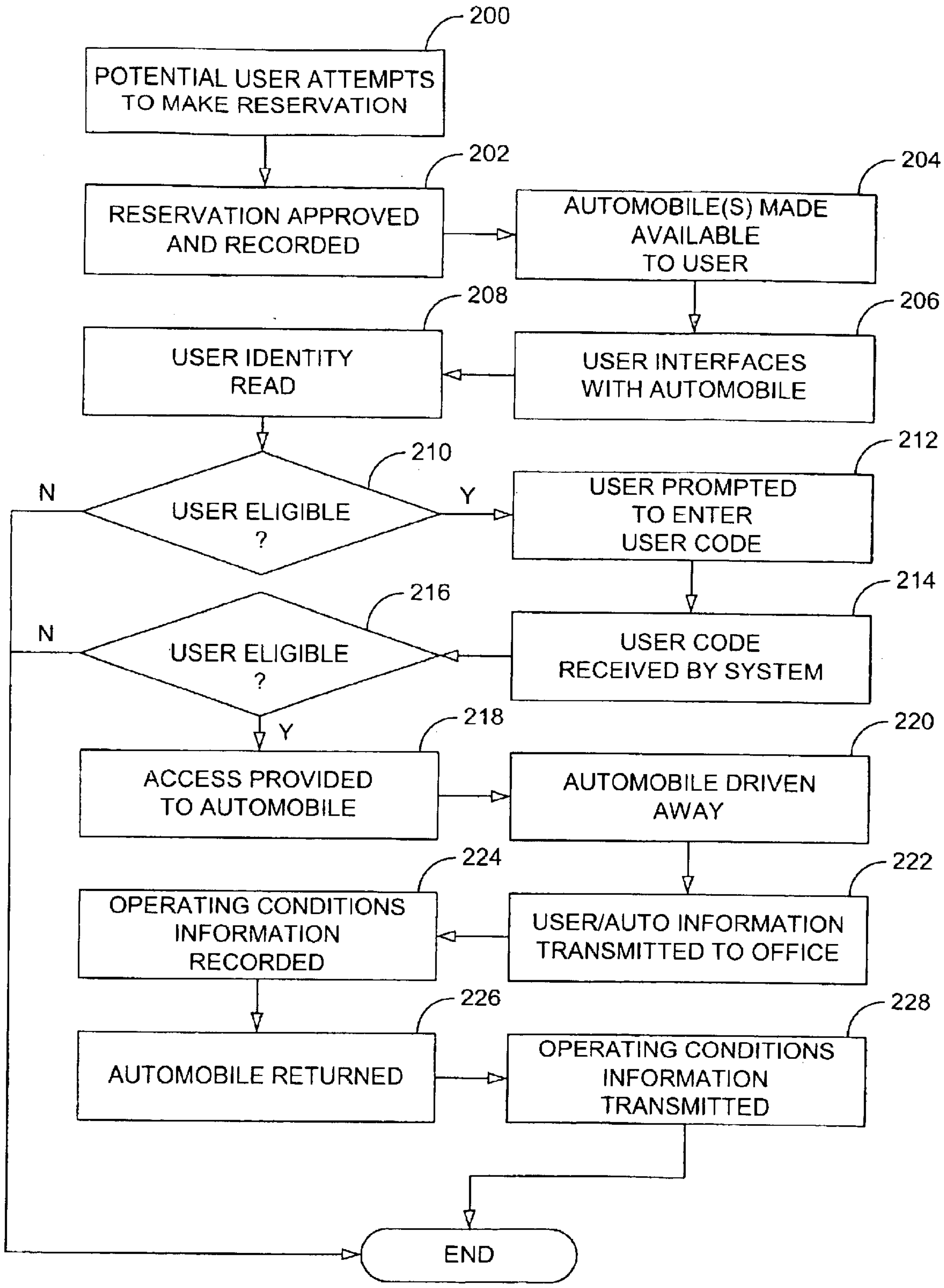
FIG. 2 is a flow diagram of a method for providing, monitoring, and reacquiring a resource according to a first embodiment of the present invention.

FIG. 2 illustrates a method for lending a resource including providing, monitoring, and reacquiring a resource according to a first embodiment of the present invention. Although this specific application is described in detail in the following discussion, it is to be understood that this application is provided for purposes of example only and that the procedures described herein are generally applicable to substantially other applications in which resources are provided to a user and later reacquired from a user.

As indicated in block 200, a potential resource user normally first attempts to make a reservation for use of an automobile with a central office that manages the lending of the automobiles. Where more than one such office exists, each of the central offices can be connected to each other through a central office network. The central office(s) have control over the automobiles and are responsible for their storage and maintenance. Normally, each central office secures a lot in which the automobiles are held until lent to users. By way of example, the user can place the reservation by phone with a central office worker, or by entering the reservation with a computer that can connect, either over a communications network, such as a local area network (LAN) or the Internet, to the central office. If an automobile is available for the specified location and time requested by the potential user, the reservation is approved and recorded as indicated in block 202.

Assuming that an automobile is available and the user is eligible for borrowing an automobile, an automobile is made available to the user as indicated in block 204. Once the automobile has been made available to the user, the user will be able to access the automobile. Preferably, the reservation information is transmitted from the central office to an automobile in the central office lot with a short range wireless communication system. Specifically, this information can be transmitted from the central office with a transmitter and received by the receiver 34 of the access/monitoring system 10 of the automobile (FIG. 1). Alternatively, a central office worker can manually download the reservation information to the automobile. For instance, the reservation information can be transmitted to the access/monitoring system 10 by making a physical connection to a serial port (not shown) of the system so that the information can be downloaded from a handheld device. Where several different automobiles are available for use, the reservation information can optionally be transmitted to several or all of the available automobiles. For instance, the user can be permitted access to any one of several or all of the available automobiles of the central office fleet and the automobiles can be taken on a first come, first served basis.

Irrespective of whether a single or multiple automobiles are made available to the user, the reservation information is stored in the system memory 28. In one arrangement, the system initially has no information about the user and all user identity information is transmitted to the automobile from the central office when a reservation is made. Alternatively, the system memory 28 can include a database comprising identity information regarding each user that is eligible for borrowing the automobile. In such an arrangement, the information transmitted to the automobile is cross-referenced with the database information so that a minimum of information is transmitted from the central office to the automobile.

Although a reservation system is described above and is presently preferred, it is to be understood that reservations are not necessary to advantageous use of the access/return system of the present invention. For instance, each available automobile can be made generally available to all or particular users (e.g., company employees). In such a scenario, the automobile memory 28 can comprise identity information concerning these persons and a user can simply take an automobile from the central office lot without a reservation. In this arrangement, no wireless communications system is necessary, thereby simplifying system hardware and lowering system cost.

Once the automobile or automobiles have been made available to the user, the user can attempt to access an automobile. In a preferred arrangement, the user interfaces with the automobile, as indicated in block 206, through the identity confirmation device 14. By way of example, the user can "swipe" his or her identity card through the identity confirmation device 14 so that the device can read the card and determine the identity of the user. In such an arrangement, the identity card can comprise a static, magnetic strip card similar to a standard credit card that contains information about who the user is and a user code. Alternatively, the identity card can comprise a solid-state chip that can similarly be read by the identity confirmation device 14 to determine the relevant information about the user.

Once the user interfaces with the identity confirmation device 14, the system 10 reads the identity information stored on the identity card, as indicated in block 208, and cross-references this identity information with the information that has been stored in system memory 28. For instance, where a reservation was made and transmitted to the automobile, the system 10 cross-references this reservation information with the user's identity information to determine whether or not the user has a valid reservation for the automobile. Alternatively, where no reservation was made, the system 10 cross-references the user's identity with the database of eligible users to determine whether or not the user is permitted to access to the automobile. In this manner, the system 10 determines whether or not the user is eligible to take the automobile as indicated at 210.

If the user is entitled to access the automobile, the user is prompted to enter his or her user code (e.g., a password and/or PIN) as indicated in block 212. By way of example, this prompt can be communicated to the user with the display device-18. Normally, the user code is entered with the security device 16. Where the security device 16 comprises a keypad, the user enters a sequence of letters and/or numbers that he or she has chosen or which has been assigned to him or her. With reference back to 210, if the user is not eligible to take the automobile for some reason, the user is denied access and flow is terminated. Optionally, the user can be notified of the denial of access with the display device 18.

After the user code has been received as indicated in block 214, the system 10 cross-references the entered code with the information stored in system memory 28 to determine whether the code is correct as indicated at 216. If this code is correct for the particular identity card used, access to the automobile is provided as indicated in block 218. In particular, the door locks of the automobile are released such that the user can access the interior of the automobile. Preferably, once the user accesses the automobile, the automobile is made unavailable to other previously eligible users to prevent a situation in which the original user is left stranded at a remote location after the automobile is taken from the location by another user. If, on the other hand, the correct code is not entered, access is denied and flow is terminated. Again, access denial can be communicated to the user with the display device 18.

Assuming the user's identity and code are acceptable, the user may enter the automobile and start it. By way of example, ignition of the automobile's engine can be enabled by insertion of the user's identity card into the ignition device 20 (e.g., another card reader). Thereafter, an ignition switch (e.g., a start button) can be activated to start the engine. By way of example, the ignition enabling device 20 can be provided in the dash of the automobile adjacent the steering column. As is apparent from the foregoing discussion, no keys are needed in the present invention to either access or start the automobile. Accordingly, accessing the automobile is expedited in that the user need not obtain the keys and instead can simply use his or her identity card to access and take the automobile.

Once the automobile has been started, the user can drive away with the automobile and use it as he or she requires as indicated in block 220. At the moment the automobile is taken, information can be transmitted to the central office, for instance with the transmitter 32, that identifies the identity of the user and automobile as well as the time the automobile was removed from the lot for the central office files as indicated in block 222.

As the user drives the automobile, the sensing device 26, in conjunction with the memory 28, records various information about the operating conditions the automobile experiences as indicated in block 224. For instance, the recording device 26 can monitor the mileage driven, the duration of use, the top speed attained, and the places to which the automobile was taken (e.g., via the GPS device 36). This information can be stored to memory 28 so that, upon return of the automobile to the central office, this information can be transmitted to the central office and recorded in the central office database.

After the user has driven the automobile and no longer needs it, he or she can return the automobile as indicated in block 226. Normally, the automobile is returned to the same location from which it was taken. Alternatively, the automobile is returned to a separate central office connected to the network. In either case, information as to the automobile operating conditions is transmitted to a central office as indicated in block 228. Preferably, this information is transmitted with the transmitter 32 (FIG. 1). Alternatively, this information can be manually downloaded by central office personnel with, for instance, a handheld device that physically connects to the access/monitoring system 10. At this point, central office records can be are updated so that the returned automobile is again made available to other users.

Figure 3:
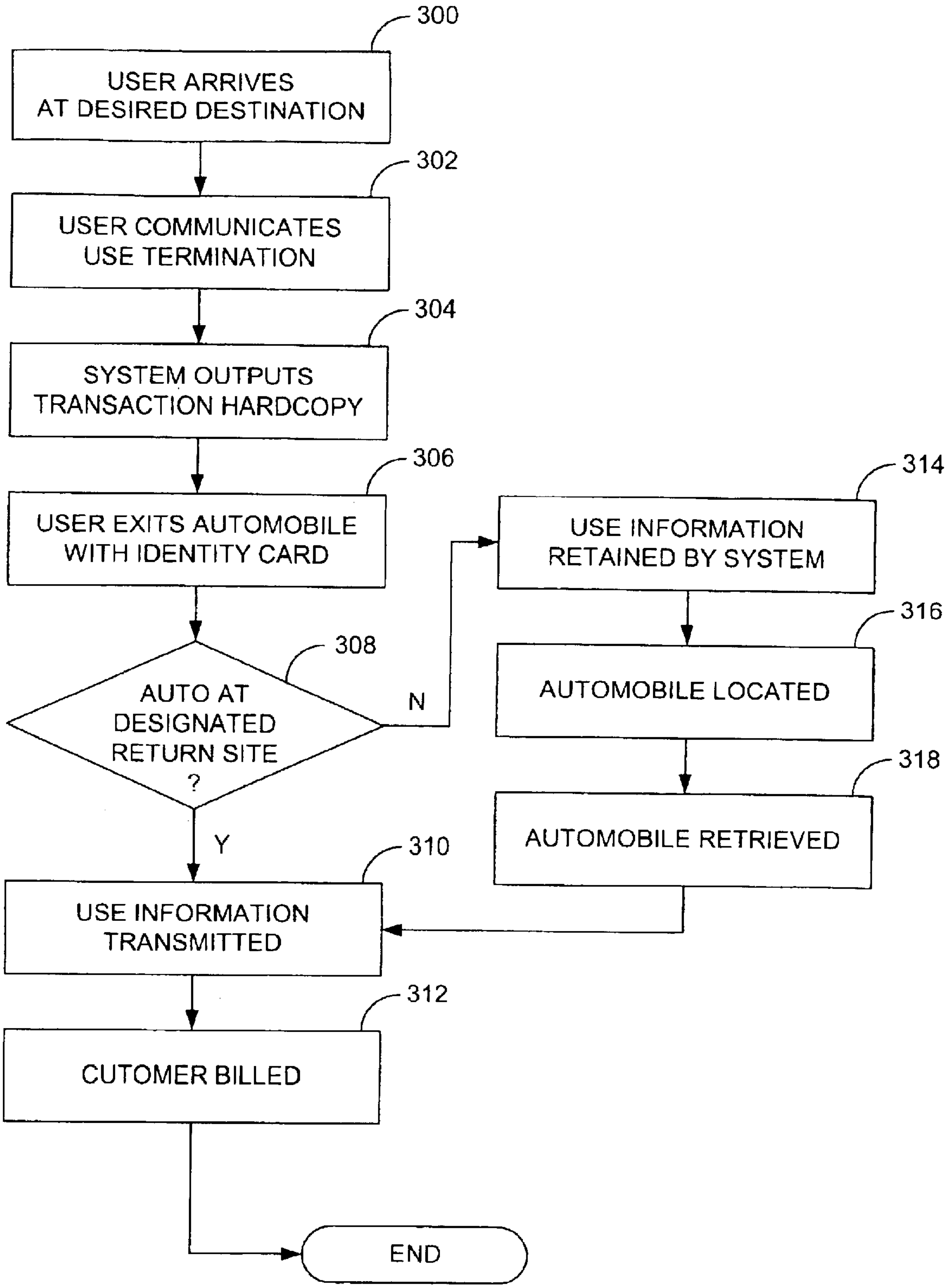
FIG. 3 is a flow diagram of a method for reacquiring a resource according to a second embodiment of the present invention.

FIG. 3 illustrates a method for returning a resource in accordance with a second embodiment of the present invention. In particular, the method identified in FIG. 3 pertains to the return of an automobile and its reacquisition by a rental car company. As will be appreciated by persons having ordinary skill in the art, access to the automobile can be provided to the user (i.e., renter) in similar manner to that described above with reference to FIG. 2. Accordingly, the user can be provided with an identity card and a user code with which the user can access the automobile. Furthermore, once having accessed the automobile, the user can start the engine of the automobile in similar manner to that described above. Therefore, pick-up of the rental car can be simplified and expedited through use of an identity card in the rental car scenario such that no keys are needed to obtain access to and drive a particular automobile. Also similar to the embodiment described in reference to FIG. 2, the operating conditions experienced by the automobile can be monitored and recorded in like manner to that described above.

With reference to FIG. 3, the user arrives at a particular destination with the automobile as indicated in block 300. The destination normally is a place that is convenient to the user so as to expedite the return process and permit the user to go on his or her way quickly. For example, this destination can be a designated automobile return lane at an airport terminal such that the user can drop the automobile off adjacent to the terminal and therefore can avoid having to return the automobile at a remote location and obtain transport to the terminal. In another embodiment, the destination can be substantially any place where the user wishes to leave the automobile. This functionality can be provided by the GPS device 36. Specifically, with GPS, the rental car company can determine the exact location of the automobile and can retrieve it to bring it back to the rental car company's central office.

Once having arrived at the desired drop-off point, the user can communicate to the system 10 that the user intends to terminate use of the vehicle and leave it as indicated in block 302. By way of example, the user can communicate termination of use by depressing a termination button located on the automobile dash. At this point, a hardcopy of the rental transaction can be generated by the user as indicated in block 304. By way of example, this hardcopy can be generated by the printing device 38. Operating in this manner, the system 10 can provide the user with an immediate tally of the rental fees for use of the automobile. By way of example, this fee can be calculated with reference to the number of miles that were driven, the duration of use, the various places to which the automobile was taken, the remoteness of the drop-off point, and the like. Optionally, the fee can also include penalties levied for misuse of the automobile. For instance, if the automobile is driven over a certain threshold speed, the user can be charged a specified amount for having broken this threshold. In addition to the rental fees, the hard copy can include a summary of the use of the automobile for the user's records.

The user can then exit the automobile as indicated in block 306, along with his or her identity card, and can shut all of the automobile doors. Typically, the automobile will automatically lock each of the doors (and trunk) after the expiration of a predetermined amount of time (e.g., a few seconds). As indicated at 308, communication of operating conditions information to the rental car company depends upon the drop-off location. Where the automobile has been left at a designated drop-off location, for example, at a return lane at an airport terminal or a rental car office, the automobile use information can be transmitted to a local receiver, as indicated in block 310, so that this information can be stored and recorded by the rental company. At this point, the customer can then be billed for all rental charges as indicated at block 312. If, on the other hand, the automobile is not returned to a designated return location, the information can instead be retained in system memory as indicated in block 314 until such time when this information can be accessed by the rental car company. The rental company can then locate the car as indicated in block 316 with, for example, GPS, and can retrieve the car as indicated in block 318. At this point, the stored use information can be downloaded from the automobile directly can be transmitted from the automobile to the rental company office upon return of the automobile to the office as indicated at block 310. Then, with reference back to block 312, the user can be billed for the use of the automobile.

What is claimed is:

1. A method for permitting a user to temporarily use a resource, comprising:

receiving user identity information with an external identity confirmation device of the resource prior to providing access to the resource;

receiving a user code with an external security device of the resource prior to providing access to the resource;

confirming the eligibility of the user to use the resource relative to the identity information and the user code;

providing the user with access to the resource;

monitoring and recording information about use of the resource with a monitoring system of the resource; and obtaining resource use information from the resource monitoring system of the resource.

2. The method of claim 1, wherein the user identity information is obtained from an identity card of the user.

3. The method of claim 2, wherein the identity confirmation device comprises a card reader.

4. The method of claim 3, further comprising cross-referencing the user identity information with information stored in a resource memory.

5. The method of claim 1, wherein the security device comprises a keypad.

6. The method of claim 5, further comprising cross-referencing the received user code with information stored in a resource memory.

7. The method of claim 1, further comprising obtaining user identity and resource information once the user takes the resource.

8. The method of claim 7, wherein the user identity and resource information is transmitted from the resource over a short-range wireless communications system.

9. The method of claim 1, wherein the resource use information is obtained from the resource once the resource has been returned.

10. The method of claim 9, wherein the resource use information is transmitted from the resource over a short-range wireless communications system.

11. The method of claim 1, wherein the user is permitted to use the resource in exchange for a rental fee.

12. The method of claim 11, further comprising providing a transaction summary to the user once the user terminates resource use.

13. The method of claim 11, further comprising automatically billing the user once the resource is reacquired.

14. The method of claim 11, further comprising locating and retrieving the resource after the user has terminated resource use.

15. A method for permitting a user to temporarily use an automobile, comprising:

receiving identity information from a user identity card with a card reader provided on the exterior of the automobile;

receiving a user code with a security device provided on the exterior of the automobile;

unlocking the automobile doors in response to receiving a user code that correctly corresponds to the identity card; and permitting the automobile engine to be started once the user identity card is received by a card reader located inside the automobile.

16. The method of claim 15, wherein the user identity and automobile information is transmitted from the automobile to a central office over a short-range wireless communications system when the automobile is taken by the user.

17. The method of claim 15 further comprising sensing and recording use conditions of the automobile with a vehicle monitoring system.

18. The method of claim 17, wherein the vehicle monitoring system monitors the mileage driven and duration of use.

19. The method of claim 18, wherein the vehicle monitoring system further monitors the places where the automobile is taken in conjunction with a GPS device of the automobile.

20. The method of claim 15, further comprising obtaining automobile use information from the automobile upon reacquisition of the automobile.

21. The method of claim 20, wherein the automobile use information is transmitted from the automobile over a short-range wireless communication system to a central office.

22. The method of claim 15, wherein the user is permitted to use the automobile in exchange for a rental fee.

23. The method of claim 22, further comprising providing a transaction summary to the user upon receiving a use termination communication from the user.

24. The method of claim 22, further comprising automatically billing the user for use of the automobile upon receipt of the use termination communication.

25. The method of claim 22, further comprising locating and retrieving the automobile after the user has communicated termination of use.

26. An access/monitoring system adapted for use in an automobile that can be made available for temporary use by a user, the system comprising:

a central controller;

an identity confirmation device provided on an exterior of the automobile that determines the identity of the user;

a security device provided on an exterior of the automobile that confirms the identity of the user; and a monitoring system capable of recording use conditions of the automobile.

27. The system of claim 26, wherein the identify confirmation device comprises a card reader provided on the exterior of the automobile that reads information from a user identity card.

28. The system of claim 26, wherein the security device is a keypad provided on the exterior of the automobile that accepts user code information from the user.

29. The system of claim 26, further comprising a communications system that transmits information to and receives information from a central office.

30. The system of claim 26, further comprising a display device that communicates information to the user.

31. The system of claim 26, further comprising a printing device that provides the user with a summary of use information.

32. The method of claim 12, wherein providing a transaction summary comprises printing out a hard copy of the transaction using a printing device of the resource.

33. The method of claim 23, wherein providing a transaction summary comprises printing out a hard copy of the transaction using a printing device within the automobile.

34. A method for permitting a user to use an automobile, comprising:

receiving identity information from a user identity card with a card reader provided on the exterior of the automobile;

cross-referencing the received identity information to verify the user's authorization to enter the automobile;

unlocking an automobile door at least in part in response to verifying the user's authorization from the received identity information; and permitting the automobile engine to be started once the same user identity card is read by a card reader located inside the automobile.

35. The method of claim 34, further comprising transmitting the user identity and automobile information from the automobile to a central office when the automobile is taken by the user.

36. The method of claim 34, further comprising sensing and recording use conditions of the automobile with a vehicle monitoring system.

37. The method of claim 34, further comprising obtaining automobile use information from the automobile upon reacquisition of the automobile.

38. The method of claim 34, further comprising printing a transaction summary using a printer within the automobile upon receiving a use termination communication from the user.

39. The method of claim 38, further comprising automatically billing the user for use of the automobile upon receipt of the use termination communication.

40. An access/monitoring system adapted for use in an automobile, the system comprising:

a central controller;

an identity confirmation device provided on an exterior of the automobile that is configured to read a user identity from a user identification card before enabling the user to enter the automobile; and an identity confirmation device provided within the interior of the automobile that is configured to read the user identity from the same user identification card before enabling an engine of the automobile to be started.

41. The system of claim 40, wherein the identify confirmation devices comprise separate card readers provided on the exterior and within the interior of the automobile, respectively.

42. The system of claim 40, further comprising a communications system that transmits information to and receives information from a central office.

43. The system of claim 40, further comprising a display device that communicates information to the user.

44. The system of claim 40, further comprising a printing device that provides the user with a summary of use information.

* * * * *